Patented July 27, 1926.

1,593,579

UNITED STATES PATENT OFFICE.

JOHN J. KESSLER, OF ST. LOUIS, MISSOURI.

PROCESS FOR INDURATING POROUS OBJECTS.

No Drawing.  Application filed August 28, 1925. Serial No. 53,211.

The object of my invention is to produce an indurated porous object by filling the porosity of the object with a waterproofing insulating compound which is polymerized on the inside of the object and which cannot be subsequently removed from the object by subsequent heating.

In carrying out my invention, I am able to take porous objects such as wood, stone, plaster, concrete or objects which contain porous elements such as electrical coils and render them waterproof and at the same time fill the porosity of these objects with an electrical insulating material of high dielectric strength and of considerable toughness and elasticity.

My process refers to what may be called a two-stage process, in that I first saturate the porosity of the object with an aldehyde in solution and afterwards saturate the object with a resinous substance of natural origin, which contains more or less free phenol or polymers of free phenol.

By free phenol or polymers of free phenol, I mean phenol or its polymers which has not been previously converted into a polymerized resin by action on formaldehyde or polymers of formaldehyde. My invention consists of polymerizing free phenol or its homologues on the inside of a porous object which has been previously saturated with aldehyde. The polymerization is conducted in the presence of a natural resin which acts as a carrier for the free phenol and serves to keep it in place while the reaction is going on. In carrying out my process, I can operate either with a solution of the natural resin containing free phenol, or I may operate with the molten resin containing free phenol.

The general nature of the reaction in either case is the same, that is, the free phenol and aldehyde react on the inside of the porous object, the natural resin serving as a carrier for the free phenol which by action with the aldehyde is converted into a polymerizable resin, and which, if sufficient aldehyde substance be present, will be converted into the infusible and insoluble variety of phenol aldehyde resin, and thus greatly increase the infusibility and insolubility of the whole mixture.

I am aware that Aylsworth in his Patent No. 1,111,286 has disclosed a two-stage process for indurating porous objects in which he takes a varnish made from a fusible and soluble phenol aldehyde resin, and treats the porous object such as wood, or stone, which has been previously saturated with an aldehyde substance.

My process is substantially different from the process of Aylsworth in that I do not use an incompletely polymerized phenol resin, but use a natural resin which has been fluxed with more or less free phenol. Such a resin will be very much tougher and more elastic than the phenol aldehyde resins which are well-known to be extremely brittle and pulverulent. I describe now a specific instance of applying my process to an electrical coil.

The coil is first dipped in a solution of hexamethylenetetramine. I found in practice that a 10 percent solution of this aldehyde substance serves to introduce into the porous object sufficient material to react with the free phenol which will be subsequently introduced along with the natural resin.

The coil may be then saturated with either the molten natural resin containing free phenol or it may be saturated with the same mixture dissolved in some suitable solvent such as alcohol.

The porous object may be then heated further in order to produce the reaction between the free phenol and the aldehyde substance.

The amount of free phenol used is varied widely depending upon the nature of the end product which is desired. In practice I have used amounts varying from 5 percent to 75 percent of the natural resin present, and even greater or lesser amounts than these may be used.

I claim:

1. The process of indurating porous objects which comprises the saturation of the object with an aldehyde substance and then the saturation of the object with a natural resin containing free phenol and then the baking of the object to produce a reaction between the free phenol and the aldehyde.

2. The process of indurating porous objects which comprises the saturation of the object with a solution of hexamethylenetetramine, drying, and then the saturation of the object with a mixture consisting of a natural resin fluxed with a phenol in a free state, and then the baking of the object to produce a reaction between the phenol and the aldehyde.

3. The process of indurating porous objects which comprises the saturation of the object with an aldehyde followed by the saturation of the object with a mixture consisting of a natural resin fluxed with a free phenol, and then the baking of the object to produce a reaction between the phenol and the aldehyde.

4. The process of indurating porous objects which comprises the saturation of the object with an aldehyde and then saturating the object with a varnish consisting of a volatile solvent and a natural resin together with a free phenol and finally baking to complete the reaction between the aldehyde and the phenol.

5. The process of insulating an electrical coil which comprises the saturation of the object with an aldehyde and then saturating the object with a varnish consisting of a volatile solvent and a natural resin together with a free phenol and finally baking to complete the reaction between the aldehyde and the phenol.

In testimony that I claim the foregoing I hereunto affix my signature.

JOHN J. KESSLER.